United States Patent
Dang Van Nhan

(10) Patent No.: US 7,808,130 B2
(45) Date of Patent: Oct. 5, 2010

(54) ELECTRONIC DEVICE FOR COMMUTATION OF ELECTRIC LOAD CONTROLLED BY A MICROCONTROLLER

(75) Inventor: Christophe Dang Van Nhan, Villejuif (FR)

(73) Assignee: Renault S.A.S., Boulogne-Billancourt (FR)

( * ) Notice: Subject to any disclaimer, the term of this patent is extended or adjusted under 35 U.S.C. 154(b) by 164 days.

(21) Appl. No.: 12/158,173

(22) PCT Filed: Dec. 8, 2006

(86) PCT No.: PCT/FR2006/051314

§ 371 (c)(1),
(2), (4) Date: Sep. 11, 2008

(87) PCT Pub. No.: WO2007/074257

PCT Pub. Date: Jul. 5, 2007

(65) Prior Publication Data

US 2009/0091374 A1   Apr. 9, 2009

(30) Foreign Application Priority Data

Dec. 22, 2005   (FR) .................................. 05 53984

(51) Int. Cl.
*H01H 9/54*   (2006.01)

(52) U.S. Cl. ...................................................... 307/140
(58) Field of Classification Search .................. 307/140
See application file for complete search history.

(56) References Cited

U.S. PATENT DOCUMENTS 5,142,474 A   8/1992   Miyata et al.

FOREIGN PATENT DOCUMENTS

DE   199 19 729   11/2000

*Primary Examiner*—Robert L. Deberadinis
(74) *Attorney, Agent, or Firm*—Oblon, Spivak, McClelland, Maier & Neustadt, L.L.P.

(57) ABSTRACT

An electronic device and method for commuting an electric load, including an electronic commutator controlled by a microcontroller, positively supplied at a voltage, with an outlet that may adopt at least three states and operating in a nominal mode that may be switched intentionally or by default to a failsafe mode in case of malfunction of the electronic commutation device. The electronic commutation device additionally includes a positive commuted supply greater than the voltage and connected to the microcontroller of the electronic commutation device by a resistive polarization device to carry out the function of safety barrier, and an interface device for recognizing the presence or absence of the positive commuted supply.

13 Claims, 2 Drawing Sheets

Figure 1:
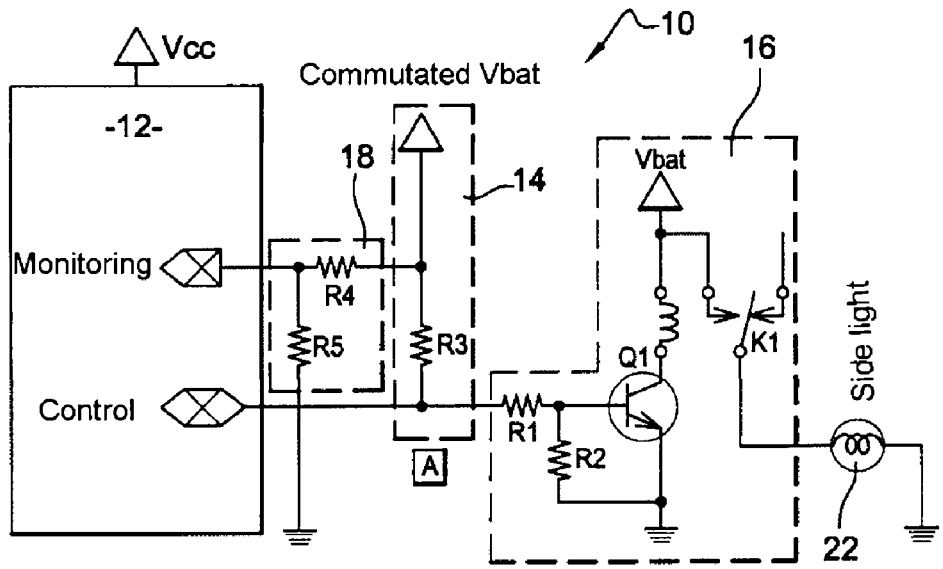

ELECTRONIC DEVICE FOR COMMUTATION OF ELECTRIC LOAD CONTROLLED BY A MICROCONTROLLER

The invention relates to a device for the commutation of electric load by an electronic system with a microcontroller. The application to motor vehicle lighting and locking functions is particularly appropriate.

When an electronic system with a microcontroller that commutates an electric load fails, this load finds itself in an uncontrolled and fixed state. The loss of control of the load renders the desired function unavailable. The unavailability of the function may in certain cases reduce the safety of the system that hosts it and its environment.

A fixed and permanent state of the load, whether it is predisposed by default or fixed randomly, may also eventually lead to other malfunctions which themselves can induce malfunctions in a cascade on other systems.

Currently, the problem is managed by the implementation of a degraded mode, in an intentional manner or quite simply by default.

A simple degraded mode consists in placing the load in a permanent inactive state. The direct disadvantage is the loss of availability of the load commutating function. The indirect disadvantage is the possible loss of safety due to the loss of availability. Furthermore, the inactive state is not necessarily the most appropriate state functionally and safetywise.

Another degraded mode consists in placing the load in a permanent active state, in order to better respond to the functional and safety needs.

For this mode, the same aforementioned disadvantages for the simple degraded mode are found. Furthermore, the prolonged active state may lead to other malfunctions such as overheating, overconsumption, the destruction of the load or of the associated commutator. The latter may induce malfunctions in a cascade on other systems such as on the cables, the fuses, the power sources. This may further have harmful consequences on availability and safety.

The two degraded modes described above are only refuge modes, according to the terminology in use in the field of reliability of operation, since they disable the function and make it unavailable.

To retain the availability of the function, the solution consists in implementing redundant systems, by the duplication of the electronic system or by the addition of a manual backup system.

However, a major disadvantage is the considerable added cost that this generates. Furthermore, a more or less complex arbitration function must be implemented to resolve possible conflicts between the two players and properly delimit the roles of each in nominal mode and degraded mode, in order to correctly satisfy the requirements of availability and safety.

Accordingly, the invention supplies an electronic device for the commutation of an electric load comprising an enhanced microcontroller-controlled electronic commutator.

The invention thus relates to an electronic device for electric load commutation comprising an electronic commutator controlled by a microcontroller supplied at a voltage Vcc, comprising an output port with at least three states and operating in a "nominal" mode, the latter being capable of switching to a "degraded" mode intentionally or by default in the event of failure of said device, characterized in that said electronic device also comprises:

a commutated supply Vbat connected via a resistive polarization device to the microcontroller of the electronic device in order to serve as a safety barrier, an interface device making it possible to recognize the presence or absence of the commutated supply Vbat.

Therefore, the object of the invention is to implement an intermediate degraded mode between the nominal mode and the refuge mode, in order to enhance the availability and safety of the system, without, for all that, adding complexity which could adversely affect the reliability, the availability, the safety and the cost of the system.

The invention therefore proposes an electronic device for electric load commutation comprising an electronic commutator controlled by a microcontroller positively supplied at a voltage Vcc, comprising an output port with at least three states and operating in a "nominal" mode, the latter being capable of switching to a "degraded" mode intentionally or by default in the event of failure of said electronic commutating device, characterized in that said electronic commutating device also comprises:

a positive commutated supply Vbat greater than Vcc and connected via a resistive polarization device to the microcontroller of the electronic commutating device in order to serve as a safety barrier, and an interface device making it possible to recognize the presence or absence of the commutated supply.

According to the features of the invention:

the operating states of the electronic commutating device make it possible to select the "nominal" or "degraded" operating mode to be preferred for the electronic commutating device, the low impedance and low impedance ground states Vcc of the output port of the microcontroller are the most dominant states, the high impedance state of the microcontroller is the most recessive, the commutated supply Vbat applied through the resistive polarization device is a state of intermediate dominance, the switch from the "nominal" mode to the "degraded" mode is carried out thanks to the switching of the output port of the microcontroller from a low impedance state to a high impedance state of the ground or of the supply Vcc.

Preferably, the commutated supply Vbat for the "degraded" mode is a supply that is common to other devices of a host system whose active state is representative of an overall phase of operation of the host system.

Advantageously, the commutated supply Vbat for the "degraded" mode originates from a manual commutator that pre-exists or is added to the host system.

Again advantageously, the commutated supply Vbat for the "degraded" mode originates both from a supply that is common to other devices of the host system and a specific manual commutator that pre-exists or is added to the host system.

Preferably, the host systems are either a side light, a stop light, or a trunk unlocking motor of a motor vehicle.

According to a feature of the invention, the electronic commutating device also comprises a sleep device making it possible to place the electronic commutating device in "sleep" mode, said sleep device being supplied by a commutated supply Vbat and triggered intentionally by the microcontroller, in which the output ports switch to the high impedance state and in which the load is permanently deactivated.

The invention also relates to an operating method of an electronic device for commutating an electric load controlled by a microcontroller operating in a "nominal" mode and capable of switching to a "degraded" mode intentionally or by default in the event of failure of the device, comprising the following steps:

a—switching of the output port of the microcontroller from a low impedance state to a high impedance state of the ground or of the supply Vcc, b—polarization of the electronic device by the commutated supply Vbat, that is greater than Vcc, and c—activation and deactivation of the load according to the commutations of the commutated supply Vbat.

Advantageously, the switch from one of the "nominal" or "degraded" operating modes to a "sleep" mode is carried out according to the following steps:

a—activation by the microcontroller of the sleep mode device, b—switching of the output ports of the microcontroller to the high impedance recessive state in order to keep the sleep device active, c—permanent deactivation of the load until the return to nominal mode.

Figure 2:
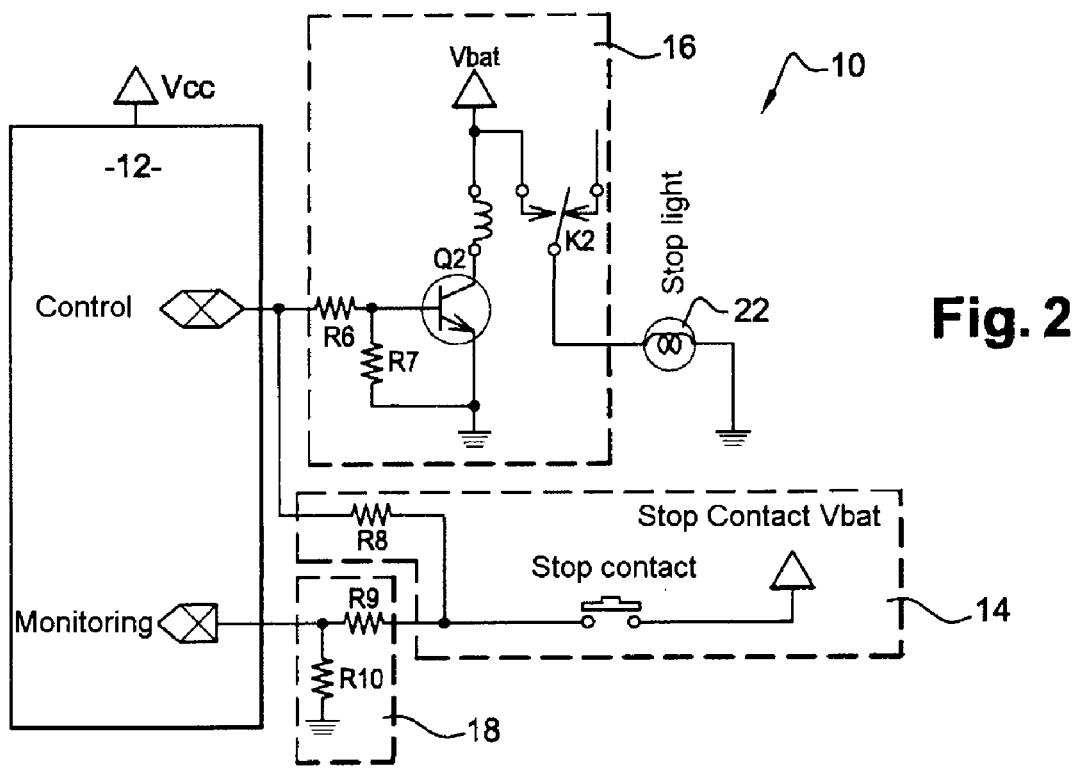
Figure 3:
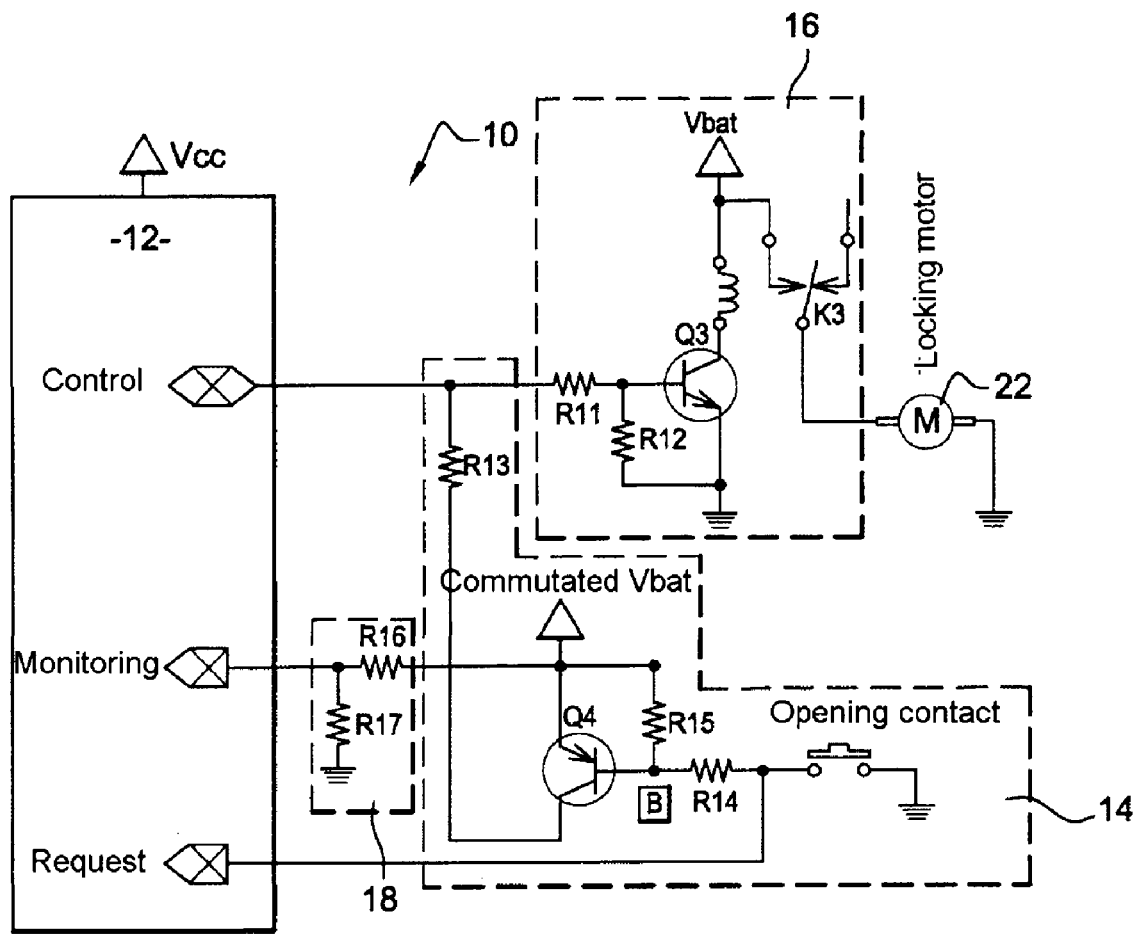
Figure 4:
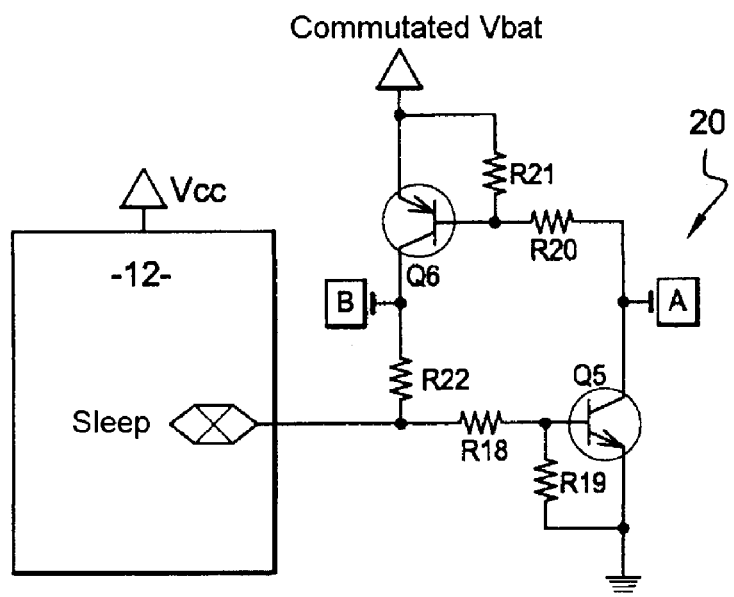

The invention is now described in a nonlimiting manner with reference to the appended drawings, in which:

FIG. 1 represents schematically a device according to the invention whose application is a side light, FIG. 2 represents schematically a device according to the invention whose application is a stop light, FIG. 3 represents schematically a device according to the invention whose application is a trunk unlocking motor, and FIG. 4 represents schematically a sleep mode device according to the invention.

With reference to the drawings, the present invention allows the effective implementation of an electric load commutating function according to a mode called "nominal" when the system has no failure, and according to a mode called "degraded" when the "nominal" mode can no longer be ensured following a failure.

In particular, the degraded mode is implemented according to the safety barrier principle, namely a palliative device that is as independent as possible, active only in degraded mode and monitored regularly in nominal mode. This advantageously ensures that the requirements of availability and safety are observed.

According to the main feature, the device consists:

of a positive supply Vbat, of a positive supply Vcc, smaller than Vbat, of a microcontroller 12 supplied at the voltage Vcc, of a monitoring means, playing the role of a "watchdog", which resets the microcontroller 12 in the event of a voltage drop or of nonrefresh by the microcontroller 12, of an output port of the microcontroller 12 with three states: low impedance Vcc, low impedance ground and high impedance ground. Conventionally, the high impedance state is the state in which the microcontroller 12 is not supplied or when the latter is reset.

of an electronic commutator 16, controlled by the output port of the microcontroller 12, which commutates the power on the load when it is positively polarized.

Thanks to these arrangements, it is possible to operate in nominal mode in the following manner, the load is activated by configuring the output port at Vcc low impedance, the load is deactivated by configuring the output port at low impedance ground, the high impedance state is not used.

According to an additional feature, the device 10 contains:

a commutated supply Vbat: routinely present in motor vehicles, typically commutated by the ignition key or by a similar device, or commutated by a manual commutator, a resistive polarization device 14 that connects the commutated Vbat state to the control of the electronic commutator 16, also connected to the output port of the microcontroller 12, an interface device 18 that connects the commutated Vbat state to another port of the microcontroller 12 configured as a logic input, making it possible to recognize the presence or absence of the commutated Vbat state.

Thanks to these arrangements, it is possible to operate in degraded mode. First of all, the switch to degraded mode takes the form of switching the output port of the microcontroller 12 to the high impedance state intentionally or by default when the microcontroller 12 is faulty. Then, the electronic commutator 16 is polarized by the commutated Vbat state. Finally, the load is activated and deactivated according to the commutations of the commutated supply Vbat.

Furthermore, thanks to these arrangements, it is possible to operate in nominal mode. First of all, the load is activated and deactivated according to the commutations of the output port of the microcontroller 12 between a low impedance Vcc state and low impedance ground, without being disrupted by the commutated Vbat state connected via a resistive polarization device 14. Then, the commutated Vbat state, which serves as a safety barrier, is monitored regularly on the input port of the microcontroller 12, in order to detect the possible loss of this barrier and to take the necessary measures.

The arbitration between the nominal mode and degraded mode devices is carried out naturally by the dominant and recessive characters of these devices. Therefore:

the low impedance Vcc and low impedance ground states of the output port of the microcontroller 12 are the most dominant states, the high impedance state of the microcontroller 12 is the most recessive state, the commutated Vbat state applied through a resistive polarization device 14 is a state of intermediate dominance.

According to a first exemplary application, the commutated Vbat state is a supply that is common to other services, typically a supply commutated by the ignition key of a motor vehicle. Thanks to this arrangement, in degraded mode, the load is activated and deactivated at the same time as the other services sharing the commutated Vbat state, according to an overall operating phase of the host system 22.

Furthermore, according to a second application, the commutated Vbat state is a supply commutated by a specific manual (but if possible pre-existing) contact which is actuated precisely at the moment when it would be desirable to commutate the load, typically a brake pedal contact that is intended to be synchronous with the lighting of the stop lights. Therefore, in degraded mode, the load is activated and deactivated in conditions close to operation in nominal mode.

Finally, according to a third application, the commutated Vbat state is a supply commutated according to several conditions, typically an association of a common commutated Vbat state (ignition key type) and a specific manual contact. Therefore, in degraded mode, it is possible to implement more advanced activation strategies, typically activations and deactivations of the load only in a window authorized by the common commutated Vbat state.

According to a variant embodiment, a third operating mode is added, namely the sleep mode which is schematized in FIG. 4 described later in the description. This is a mode that is triggered intentionally by the microcontroller 12, in which the output ports switch to the high impedance state, and in which the load is permanently deactivated.

According to a first mode of execution of this variant, the commutated Vbat state is considered to be disconnected at the same time as the switch to sleep mode, and in these conditions the electronic commutation device 10 is designed so that the load is not activated. Therefore, the switch to sleep mode induces the permanent deactivation of the load, until the return to nominal mode.

According to a second mode of execution of this variant, the commutated Vbat state is considered to be not disconnected at the same time as the switch to sleep mode, in which case it is necessary to prevent this sleep mode from triggering the degraded mode, since the recessivity of the high impedance state of the sleep mode leaves control to the degraded mode devices. Accordingly, a device 20 is added that is activated on the switch to sleep mode and which forces the deactivation of the load with a dominant state preventing any action of the degraded mode devices, and it does so throughout the sleep mode. Such a device 20 is controlled directly or indirectly by the microcontroller 12, and therefore has a capability to store its state when the microcontroller 12 is no longer capable of control after its switch to sleep mode.

Thanks to these arrangements, the switch to sleep mode is carried out, first of all, via the microcontroller 12 which activates the sleep mode device and places itself in sleep mode. Then, the output ports of the microcontroller 12 switch to high impedance. The sleep mode device 20 then maintains its active state. This state of the sleep mode device 20 forces the permanent deactivation of the load, until the return to nominal mode (when the microcontroller 12 will deactivate the sleep mode device).

Other features and advantages of the invention will emerge from the following description with reference to the appended drawings which are given only as nonlimiting examples.

FIRST EMBODIMENT

Example of the Side Light

According to this first embodiment represented in FIG. 1, the electronic commutator 16 is embodied as an example with a relay in a configuration allowing forcing to the Vbat state or "high side" (K1 component) controlled by a bipolar transistor NPN in a configuration making it possible to draw to the ground or "low side" (Q1 component and its polarization resistors R1 and R2). This electronic commutator 16 is itself controlled by a three-state output port of the microcontroller 12 ("control" port). Thanks to these arrangements, operation in nominal mode is ensured: the load is activated when the control is at low impedance Vcc, and deactivated when the control is at low impedance ground.

To this is added a commutated Vbat supply (for example: a commutated supply by the ignition key in a motor vehicle) connected via a resistor R3 to the control of the electronic commutator 16 (also connected to the output port of the microcontroller 12).

Therefore, operation in degraded mode is ensured when the output port of the microcontroller 12 is in the high impedance recessive state: the load is activated when the commutated Vbat state is present, and deactivated when the commutated Vbat state is disconnected. These arrangements in no way adversely affect the operation in nominal mode, because of the resistive connection R3 that must be sufficiently resistive to be recessive relative to the low output impedances of the port of the microcontroller 12.

Again added to this is an interface device 18, embodied here as an example with a bridge of resistors R4 and R5, allowing the microcontroller 12 to detect the presence or absence of the commutated Vbat state, by simple binary reading of an input port ("monitoring" port). Thanks to these arrangements, the whole of the safety barrier is monitored during operation in nominal mode.

According to this first embodiment, the availability and safety of the function is ensured by the implementation of a nominal mode and a degraded mode with a monitored safety barrier, advantageously using the high impedance recessive state intrinsic to the microcontroller 12 in the event of failure, and advantageously by using a commutated Vbat state already available (for example: ignition key in a motor vehicle) to carry out the commutation of the load in degraded mode (for example: switching on the side light when starting the vehicle and switching the light off when disconnecting the ignition).

SECOND EMBODIMENT

Example of the Stop Light

According to this second embodiment represented in FIG. 2, the electronic commutator 16 is embodied as an example with a relay in a configuration allowing forcing to the Vbat state (component K2) controlled by a bipolar transistor NPN in a configuration allowing drawing to ground (component Q2 and its polarization resistors R6 and R7). This electronic commutator 16 is itself controlled by a three-state output port of the microcontroller 12 ("control" port). Thanks to these arrangements, the operation in nominal mode is ensured: the load is activated when the control is at low impedance Vcc, and deactivated when the control is at low impedance ground.

To this is added a Vbat supply commutated by a manual contact such as the contact of the brake pedal connected via a resistor R8 to the control of the electronic commutator 16 also connected to the output port of the microcontroller 12. Thanks to these arrangements, the operation in degraded mode is ensured when the output port of the microcontroller 12 is at the high impedance recessive state: the load is activated when the manual contact is closed, and deactivated when the manual contact is open.

These arrangements in no way adversely affect the operation in nominal mode, because of the resistive connection R8 that must be sufficiently resistive to be recessive relative to the low output impedances of the port of the microcontroller 12.

To this is again added an interface device 18, embodied here as an example with a bridge of resistors R9 and R10, allowing the microcontroller 12 to detect the closure or opening of the manual contact by simple binary reading of an input port ("monitoring" port).

Therefore, the monitoring of the whole safety barrier is ensured during operation in nominal mode, provided that the manual contact is activated regularly in nominal mode. This is the case of the example of the stop light since the closure of the contact of the brake pedal is very common and furthermore very often the origin of the decision to activate the stop light in nominal mode.

According to this second embodiment, the availability and safety of the function is ensured by the implementation of a nominal mode and a degraded mode with a monitored safety barrier, advantageously using the high impedance recessive state that is intrinsic to the microcontroller 12 in the event of failure, and by advantageously using a manual contact already available for carrying out the commutation of the load in degraded mode like the lighting of the stop light each time the brake pedal is pressed.

THIRD EMBODIMENT

Example of the Trunk Unlocking Motor

According to this third embodiment represented in FIG. 3, the electronic commutator 16 is embodied as an example with a relay in a configuration allowing forcing to the Vbat state (component K3) controlled by a bipolar transistor NPN in a configuration allowing the drawing to ground (component Q3 and its polarization resistors R11 and R12). This electronic commutator 16 is itself controlled by a three-state output port of the microcontroller 12 ("control" port). Thanks to these arrangements, the operation in nominal mode is ensured: the load is activated when the control is at low impedance Vcc, and deactivated when the control is at low impedance ground.

To this is added a device consisting of a bipolar transistor PNP in a configuration allowing the forcing to the Vbat state (component Q4 and its polarization resistors R14 and R15), supplied by a commutated Vbat state (for example: a supply commutated by the ignition key in a motor vehicle), and controlled by a manual contact, the whole being connected via a resistor R13 to the control of the electronic commutator 16 also connected to the output port of the microcontroller 12.

Thanks to these arrangements, the operation in degraded mode is ensured when the output port of the microcontroller 12 is at the high impedance recessive state, according to a more advanced strategy: the load is activated when the manual contact is closed, and deactivated when the manual contact is open, but all this only when the commutated Vbat state is present, because, when the latter is disconnected, the load is deactivated independently of the state of the manual contact.

These arrangements in no way adversely affect the operation in nominal mode, because of the resistive connection R13 that must be sufficiently resistive to be recessive relative to the low output impedances of the port of the microcontroller 12.

To this is again added an interface device 18, embodied here as an example with a bridge of resistors R16 and R17, allowing the microcontroller 12 to detect the presence or absence of the Vbat state commutated by simple binary reading of an input port ("monitoring" port).

Thanks to these arrangements, the monitoring of the whole safety barrier is ensured during the operation in nominal mode, provided that the state of health of the manual contact is also monitored in nominal mode. This may be the case of the example of unlocking the trunk, since the closure of the contact is read on the "request" port in nominal mode, but which may be difficult to implement because of the statistics of activation of the contact which are not as simple as in the case of the brake pedal contact.

According to this third embodiment, the availability and safety of the function is ensured by the implementation of a nominal mode and a degraded mode with monitored safety barrier, advantageously using the high impedance recessive state intrinsic to the microcontroller 12 in the event of failure, and by advantageously using a commutated Vbat state already available (for example: ignition key in a motor vehicle) and a manual contact already available (for example: the trunk opening contact) to carry out the commutation of the load in degraded mode, according to an advanced strategy (for example: unlocking the trunk on each pressure on the opening contact, provided that the key contact is engaged).

According to a variant of this third embodiment, and returning to the example of unlocking the trunk, the manual contact used in degraded mode is a contact that differs from the manual contact used in nominal mode for controlling the unlocking, this being in order to ensure the tolerance to a fault on these contacts (while a single manual contact used both in nominal mode and degraded mode may lead to the unavailability of the function on a simple failure of this contact).

VARIANT EMBODIMENT

Sleep Mode Device

According to a variant embodiment represented in FIG. 4, a flip flop device 20 is added; it is embodied as an example with a bipolar transistor NPN in a configuration allowing the drawing to ground (component Q5 and its polarization resistors R18 and R19), looped back through a resistor R22 with a bipolar transistor PNP in a configuration allowing forcing to the commutated Vbat state (component Q6 and its polarization resistors R20 and R21).

This flip flop 20 is supplied at a commutated Vbat supply, and controlled by a three-state output port of the microcontroller 12 ("sleep" port), so as to behave in the following manner depending on the state of the output port:
  at low impedance Vcc, the point A is at low impedance ground, the point B is in the low impedance Vbat state,
  at low impedance ground, the point A is in the high impedance Vbat state, the point B is at high impedance ground, and
  at high impedance, the points A and B retain their states (however with a still higher impedance for B in the high impedance ground state).

The points A and B are connected to their homonyms of FIG. 1 of the first embodiment (example of the side light) and of FIG. 3 of the third embodiment (example of unlocking the trunk).

Thanks to these arrangements, the microcontroller 12 can signal the switch to sleep mode by setting its output port to low impedance Vcc, and storing this state at the time of the effective switch to sleep mode and the setting to high impedance of the output port. In this state, the electronic commutator 16 of the first embodiment (example of the side light) is polarized to ground, and the commutated Vbat state of the third embodiment (example of unlocking the trunk) is forced to disconnection, which results in disabling the loads, preventing any degraded mode device from being used, until the return to nominal mode (when the microcontroller 12 will again change the state of the flip flop by setting a low impedance ground on its output port).

Thanks also to this device, it is possible to prevent a furtive activation of the load while the microcontroller 12 resets and its output ports are in the high impedance state, in particular in the first embodiment in which the commutated Vbat state may be present during the reset.

The invention claimed is:

1. An electronic device for electric load commutation, comprising:
  an electronic commutator controlled by a microcontroller positively supplied at a voltage, including an output port with at least three states and operating in a nominal mode capable of switching to a degraded mode intentionally or by default in event of failure of the electronic commutating device;
  a positive commutated supply greater than the voltage and connected via a resistive polarization device to the microcontroller of the electronic commutating device to serve as a safety barrier; and
  an interface device making it possible to recognize the presence or absence of the positive commutated supply.

2. The electronic device as claimed in claim 1, wherein the operating states of the electronic commutating device make it possible to select the nominal or degraded operating mode to be preferred for the electronic commutating device.

3. The electronic device as claimed in claim 2, wherein low impedance and low impedance ground states of the output port of the microcontroller are most dominant states.

4. The electronic device as claimed in claim 2, wherein the high impedance state of the microcontroller is most recessive.

5. The electronic device as claimed in claim 2, wherein the positive commutated supply applied through the resistive polarization device is a state of intermediate dominance.

6. The electronic device as claimed in claim 1, wherein the switching from the nominal mode to the degraded mode takes place due to switching of the output port of the microcontroller from a low impedance state to a high impedance state of ground or of the voltage.

7. The electronic device as claimed in claim 1, wherein the positive commutated supply for the degraded mode is a supply common to other devices of a host system whose active state is representative of an overall phase of operation of the host system.

8. The electronic device as claimed in claim 7, wherein the host systems are either a side light, a stop light, or a trunk unlocking motor of a motor vehicle.

9. The electronic device as claimed in claim 1, wherein the positive commutated supply for the degraded mode originates from a manual commutator that pre-exists or is added to the host system.

10. The electronic device as claimed in claim 1, wherein the positive commutated supply for the degraded mode originates both from a supply that is common to other devices of the host system and a specific manual commutator that pre-exists or is added to the host system.

11. The electronic device as claimed in claim 1, further comprising a sleep device configured to place the electronic commutating device in a sleep mode, the sleep device being supplied by the positive commutated supply and triggered intentionally by the microcontroller, in which the output ports switch to a high impedance state and in which the load is permanently deactivated.

12. An operating method of an electronic device for commutating an electric load controlled by a microcontroller operating in a nominal mode and capable of switching to a degraded mode intentionally or by default in event of failure of the device, the method comprising:
    switching the output port of the microcontroller from a low impedance state to a high impedance state of ground or of a supply voltage;
    polarizing the electronic device by a commutated supply, that is greater than the supply voltage; and
    activating and deactivating the load according to commutations of the commutated supply.

13. The method as claimed in claim 12, wherein the switching from one of the nominal or degraded operating modes to a sleep mode takes place according to:
    activation by the microcontroller of a sleep mode device;
    switching of the output port of the microcontroller to the high impedance recessive state to keep the device active; and
    permanent deactivation of the load until a return to the nominal mode.

* * * * *